US012758930B2

(12) United States Patent
Ocampo et al.

(10) Patent No.: US 12,758,930 B2
(45) Date of Patent: Oct. 13, 2026

(54) APPARATUS AND METHODS FOR SYNTHESIZING COMPOUNDS

(71) Applicant: UNIVERSITY OF SOUTH FLORIDA, Tampa, FL (US)

(72) Inventors: Jonna Ocampo, Dunnellon, FL (US); Daniel Luis Morejon, Tampa, FL (US); Abraham Sanchez-Rodriguez, Bradenton, FL (US); Stephanie Lutton Carey, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 517 days.

(21) Appl. No.: 18/263,485

(22) PCT Filed: Jan. 28, 2022

(86) PCT No.: PCT/US2022/014399
§ 371 (c)(1),
(2) Date: Jul. 28, 2023

(87) PCT Pub. No.: WO2022/165238
PCT Pub. Date: Aug. 4, 2022

(65) Prior Publication Data

US 2024/0082799 A1 Mar. 14, 2024

Related U.S. Application Data

(60) Provisional application No. 63/142,885, filed on Jan. 28, 2021.

(51) Int. Cl.
*B01F 35/52* (2022.01)
*B01F 27/83* (2022.01)
(Continued)

(52) U.S. Cl.
CPC ............ *B01F 35/522* (2022.01); *B01F 27/83* (2022.01); *B01F 35/187* (2022.01);
(Continued)

(58) Field of Classification Search
CPC ............................ B01F 35/522; B01F 35/7544
See application file for complete search history.

(56) References Cited

U.S. PATENT DOCUMENTS 4,889,432 A * 12/1989 Patterson ................. A61C 5/64 366/139
5,101,804 A * 4/1992 Cohn ...................... F24V 30/00 604/113
(Continued)

FOREIGN PATENT DOCUMENTS

CN 203540444 U 4/2014
CN 107469736 A 12/2017
(Continued)

OTHER PUBLICATIONS

International Search Report of related PCT/US2022/014399, mailed on Apr. 13, 2022, 2 pages.
(Continued)

*Primary Examiner* — Elizabeth Insler
(74) *Attorney, Agent, or Firm* — HUSCH BLACKWELL LLP

(57) ABSTRACT

Disclosed are devices and methods for synthesizing products. The disclosed devices and methods may be used to synthesize products, e.g., pharmaceutical or therapeutic compounds (i.e., drugs), ceramics, catalysts, biological polymers (i.e., proteins, enzymes), cells, tissues, or combinations thereof. The devices and methods may be operated in a microgravity environment.

16 Claims, 7 Drawing Sheets

(51) Int. Cl.

| | |
|---|---|
| ***B01F 35/00*** | (2022.01) |
| ***B01F 35/71*** | (2022.01) |
| ***B01F 35/75*** | (2022.01) |
| ***B01F 35/93*** | (2022.01) |
| *A61J 3/00* | (2006.01) |
| *B01F 35/90* | (2022.01) |

(52) U.S. Cl.
CPC ...... *B01F 35/7174* (2022.01); *B01F 35/7544* (2022.01); *B01F 35/7547* (2022.01); *B01F 35/93* (2022.01); *A61J 3/00* (2013.01); *B01F 2035/98* (2022.01); *B01F 2035/99* (2022.01)

(56) References Cited

U.S. PATENT DOCUMENTS

| | | | | |
|---|---|---|---|---|
| 5,702,182 | A * | 12/1997 | Alvarado ............ | B01F 33/5011 366/267 |
| 10,010,362 | B2 * | 7/2018 | Vogt .................... | B01F 35/7139 |
| 2014/0012271 | A1 * | 1/2014 | Steckel ................. | B01F 35/522 106/35 |
| 2016/0152491 | A1 | 6/2016 | Rajagopalan et al. | |
| 2017/0028367 | A1 * | 2/2017 | Ho ...................... | B01F 27/1123 |
| 2018/0207604 | A1 | 7/2018 | Jensen et al. | |
| 2019/0126229 | A1 | 5/2019 | Adamo et al. | |
| 2020/0254409 | A1 * | 8/2020 | Savino .................. | B01F 35/881 |

FOREIGN PATENT DOCUMENTS

| | | | |
|---|---|---|---|
| CN | 108722331 | A | 11/2018 |
| FR | 2819536 | A1 | 7/2002 |
| WO | 2019096925 | A1 | 5/2019 |
| WO | 2022165238 | A1 | 8/2022 |

OTHER PUBLICATIONS

Written Opinion of related PCTPCT/US2022/014399, mailed on Apr. 13, 2022, 6 pages.

Adamo, Andrea, et al. "On-demand continuous-flow production of pharmaceuticals in a compact, reconfigurable system." Science 352.6281 (2016): 61-67.

Thalesnano, Inc., Phoenix Flow Reactor: Your Solution to Dead-End Chemistry (2019). https://thalesnano.com/post_application/phoenix-flow-reactor-your-solution-to-dead-end-chemistry-application-1/. p. 1. Printed on Dec. 7, 2023.

* cited by examiner

APPARATUS AND METHODS FOR SYNTHESIZING COMPOUNDS

CROSS-REFERENCE TO RELATED APPLICATION

This application represents the national stage entry of International Application No. PCT/US2022/014399, filed on Jan. 28, 2022, and claims the benefit of U.S. Provisional Patent Application No. 63/142,885 filed Jan. 28, 2021, which is hereby incorporated by reference for all purposes as if set forth in its entirety herein.

BACKGROUND

There is great interest in investigating the effects of low-gravity conditions, as one might encounter on the International Space Station (ISS), on the synthesis of various compounds, including pharmaceutical compounds, as there is evidence that a low-gravity environment may be useful in developing new or improved compounds that, at least currently, cannot be synthesized under earth's gravity. Such compounds could then be used in space as well as on earth.

In addition to such interests in developing new or improved compounds, there is also interest in studying whether or not existing compounds, such as drugs, can be synthesized on demand within low-gravity environments, such as those in space. As degradation of certain compounds, such as antibiotics, has been observed on the ISS, it may be advantageous to be able to synthesize such compounds within the low-gravity environment near in time to when they will be used in an effort to avoid such degradation.

In order to synthesize compounds in a low-gravity environment, such as that on a spacecraft or space station, needed is a compound synthesis apparatus that is not only effective in synthesizing compounds in low-gravity conditions but also small and light enough to be practical for delivery to and use in the low-gravity environment.

SUMMARY

Disclosed are devices and methods for synthesizing products. The disclosed devices and methods may occur in a microgravity environment.

In one aspect, the disclose provides a device comprising a housing having a hollow interior space. The housing includes at least a first stage and a second stage, where a top end of the first second stage is connected to a bottom end of the first stage. In some embodiments, the first stage includes a divider plate that extends between opposing interior surfaces of the first stage. The divider plate includes at least one opening. In some embodiments, the first stage further includes a holding chamber configured to receive raw materials to be used to synthesize a product. The holding chamber includes a holding chamber wall that extends from the at least one opening to a holding chamber base wall in the hollow interior space of the housing. The holding chamber includes an exit port that allows the passage of the raw material from the first stage to the second stage. In some embodiments, the second stage includes a mixing chamber in which the raw materials can be received from the at least one holding chamber and mixed together to synthesize the product. The second stage includes a mixing element that extends through a supplemental opening in the divider plate in the first stage to the mixing chamber. The mixing element is configured to mix or grind the raw materials and the synthesized product in the mixing chamber.

In some embodiments, the disclosure provides a device. The device comprises multiple holding chambers configured to receive raw materials to be used to synthesize a compound. The device includes a mixing chamber in which the raw materials can be received from the holding chambers and mixed together to synthesize the compound, and means for driving the raw materials and the synthesized compound through the device.

In some embodiments, the disclosure provides a method of using the device of the immediately preceding paragraph to produce a synthesized product. The method includes feeding raw materials to the at least one holding chamber and transporting the raw materials to the mixing chamber of the second stage. The method further includes mixing the raw materials in the mixing chamber using the mixing element to produce the synthesized product. In some embodiments, the device is in a microgravity environment when producing the synthesized product.

In some embodiments, the disclosure provides a method of withdrawing a product or byproduct from the mixing chamber via access through the first stage or the second stage. In some embodiments, the product or byproduct is removed from the first stage or second stage via a vacuum line configured in the second stage. In some embodiments, the product or byproduct is removed through the at least one opening in the divider plate of first stage, or through the supplemental opening. In some embodiments, the method includes performing testing on the removed product or byproduct, or collecting the product or byproduct as an alternative end-product derivative. In some embodiments, the method includes using the removed product or byproduct in multi-omic platforms for data analysis (e.g., epigenomics, genomics, proteomics, metabolomics, transcriptomics, translatomics, methylomics, and pharmaco-genetics. Exemplary products or byproducts that may be removed from the mixing chamber include, but are not limited to, liquid media, solutes, supernatants, pharmaceutical or therapeutic compounds (i.e., drugs), ceramics, catalysts, biological polymers (i.e., proteins, enzymes), cells, tissues, or combinations thereof.

BRIEF DESCRIPTION OF THE DRAWINGS

The disclosure will hereafter be described with reference to the accompanying drawings, wherein like reference numerals denote like elements.

DETAILED DESCRIPTION

Figure 1:
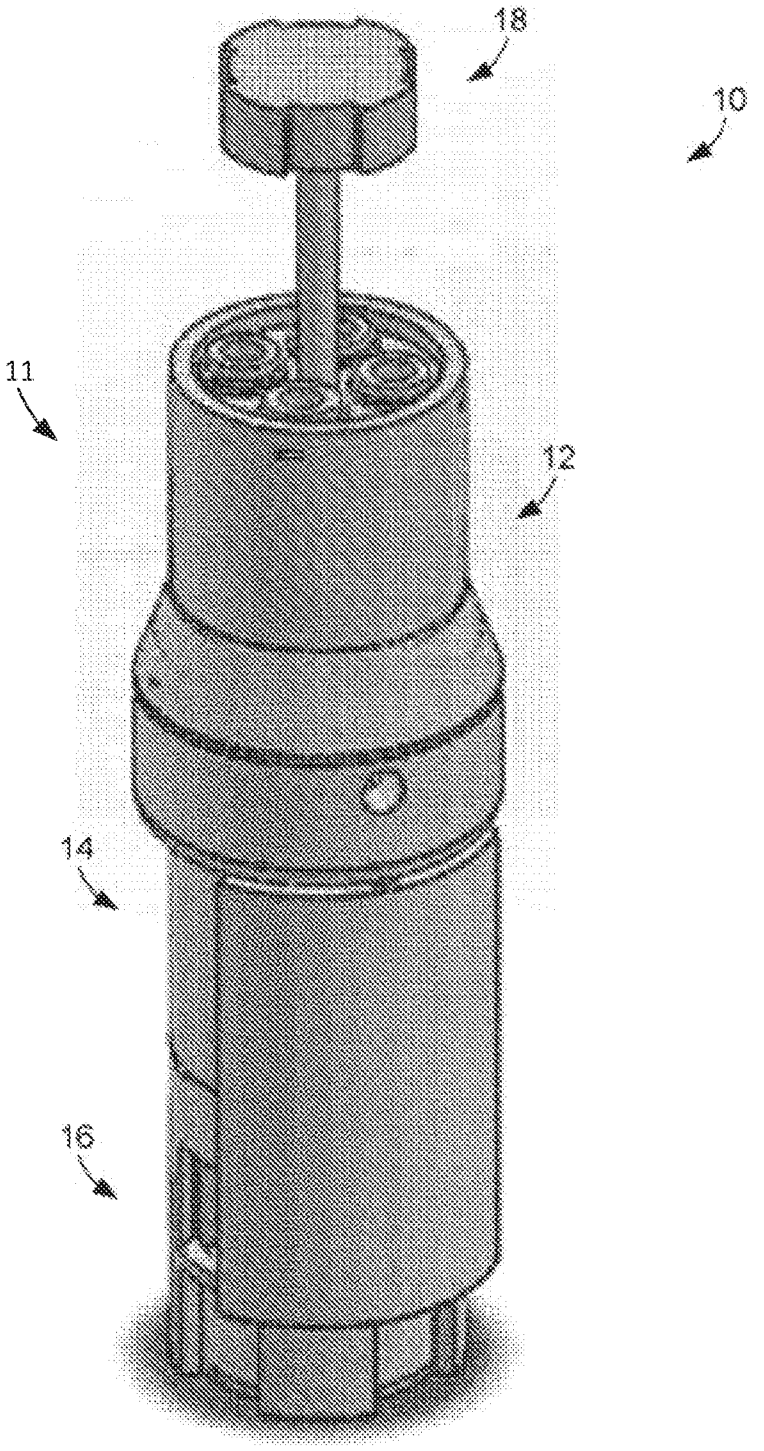
FIG. 1 is a perspective view of a device according to some embodiments of the present disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Furthermore, the various stages described herein may be optional in some configurations, and/or may be modified individually or collectively as compared to the specific configurations shown in the drawings, according to the principles described herein. Various alternative permutations and organizations of the components and stages described below are contemplated.

It is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

As described above, needed is a compound synthesis apparatus that is not only effective in synthesizing compounds in low-gravity conditions but also small and light enough to be practical for delivery to use in a low-gravity environment, such as that of a spacecraft or space station. Disclosed herein are examples of such an apparatus. More particularly, disclosed are alternatives for synthesis devices and methods that can be used to synthesize various products, including but not limited to, pharmaceutical or therapeutic compounds (i.e., drugs), ceramics, catalysts, biological polymers (i.e., proteins, enzymes), cells, tissues, or combinations thereof. As described below, the devices and methods can be configured to receive raw materials and use them to synthesize a desired product. In some embodiments, the devices are configured to at least partially automate the synthesis process once provided with the necessary raw materials. In further embodiments, the devices are alternatively or additionally capable of being manually operated to synthesize the compounds, microorganisms, tissues, cells, or combinations thereof. As will be understood from the below description, the novel features and advantages of the components and stages described herein can be realized in a number of alternative configurations.

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

FIGS. 1-5 illustrate an example apparatus or device 10 for synthesizing products, such as compounds, microorganisms, or cells. In the following discussion, it is at some points assumed (for the sake of explanation, and not by limitation) that the products to be synthesized are pharmaceutical compounds (though, as noted above, other compounds are contemplated) and that those compounds are to be synthesized in a low-gravity environment. As used herein, the term "low-gravity" or "microgravity," which are used interchangeably, may refer to an environment where minuscule forces are experienced resulting in weightlessness. Microgravity conditions may be obtained in an orbiting spacecraft. Microgravity conditions may also be simulated using known methods, such as droptubes, parabolic flights, random-positioning machines, and rotary cell culture systems. It will be appreciated, however, that the device 10 can be used to synthesize products whether in low-gravity environments or under earth's gravitational pull. Accordingly, the device 10 is not limited to use in synthesizing particular compounds or in particular environments.

Beginning with FIG. 1, illustrated is an example of an assembled device 10 for achieving the advantages and results described herein. As indicated in this figure, the device 10 is comprised of multiple modules or stages that are connected to each other end to end to form the elongated, generally cylindrical configuration shown in FIG. 1. In this example, the device 10 includes a housing 11 having a hollow interior space. The housing 11 includes at least one of a first (top) stage 12, a second (middle) stage 14, and a third (bottom) stage 16. As shown in the figure, a top end of the second stage 14 is connected to the bottom end of the first stage 12, and the top end of the third stage 16 is connected to the bottom end of the second stage 14. Although three stages 12-16 are shown in FIG. 1, it is noted that, in other embodiments, the device 10 can include a lesser or greater number of stages. Irrespective of their number, the various stages of the device 10 can be quickly and easily connected and disconnected. By way of example, the stages 12-16 can connect to each other in a twist-to-lock manner in which two stages can be connected by pressing their ends together and twisting in a first direction, and then disconnected by twisting the stages in the opposite direction and pulling them apart. In some embodiments, the assembled device 10 is no taller than approximately 22 inches and has a diameter no greater than approximately 5 inches. Of course, the size of the device 10 can be changed if desired and may depend in part upon the particular application(s) for which the device will be used (e.g., what product(s) is/are to be synthesized in what environment(s)).

Each stage 12-16 can be made of or incorporate a material that provides protection of its contents from electromagnetic radiation, which could be encountered outside of earth's atmosphere. For example, the outer walls of each stage 12-16 can be made of or otherwise incorporate a suitable shielding polymeric material, such as polyethylene, or a suitable shielding metal material, such as lead or other graphitic metal oxide.

As is further illustrated in FIG. 1, the device 10 can also include a mixing element 18 that can be used to, for example, grind and mix raw materials together within the device 10 for the purpose of synthesizing a product. In some embodiments, the mixing element 18 is configured as a plunger or impeller that can be linearly displaced along a central longitudinal axis of the mixing element 18 and the device 10, and also twisted about that axis. Notably, such movement of the mixing element 18 can be automated through use of one or more motors (e.g., servo motors) and/or actuator of the device 10, or can be achieved by manual manipulation by a user. As with other components of the device 10 that are described below, the mixing element 18 can, in some embodiments, be configured for both automatic and manual actuation.

Figure 2A:
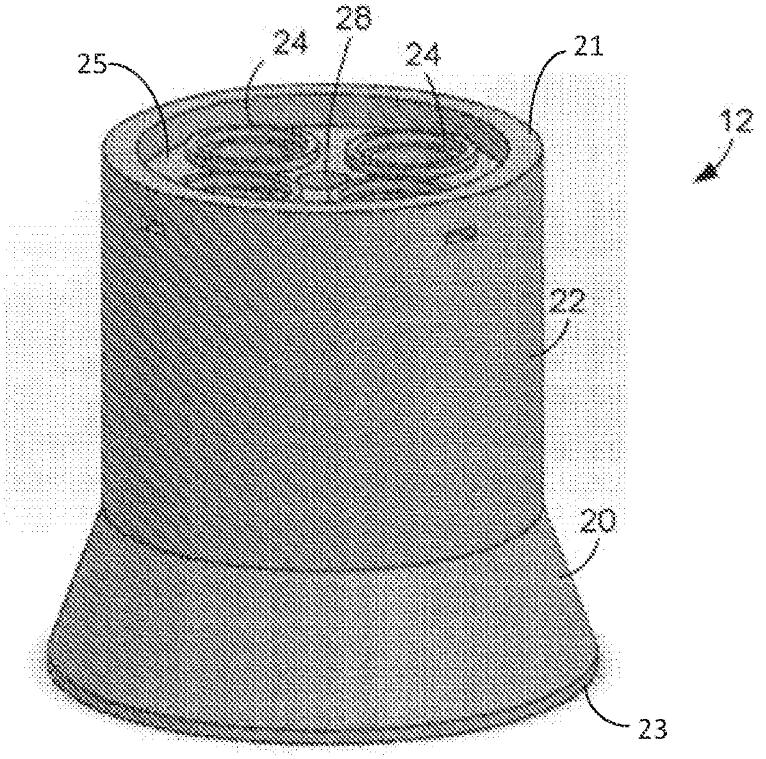
FIG. 2A is a perspective view of a first stage of a device according to some embodiments of the present disclosure.
Figure 2B:
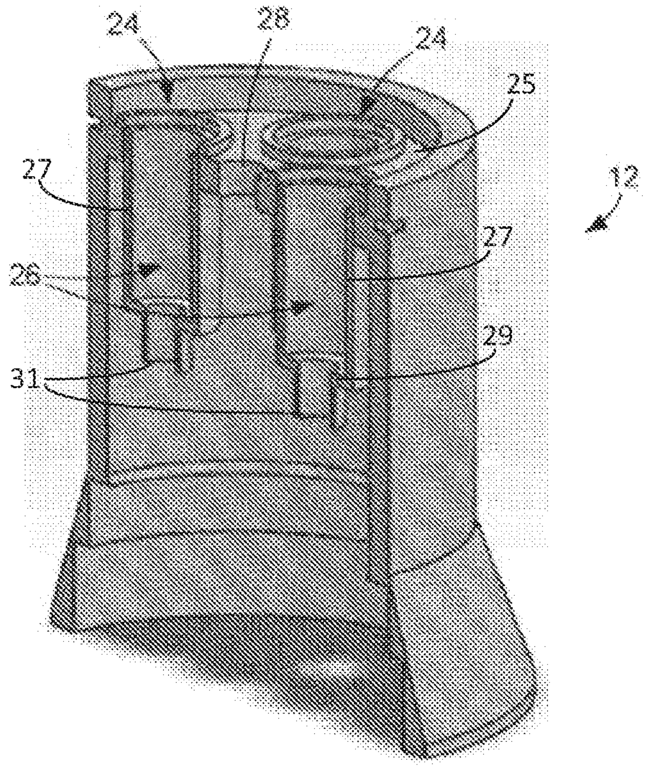
FIG. 2B is a cross-sectional view of a first stage of a device according to some embodiments of the present disclosure.

Each stage 12-16 of the device 10 can perform a different function in the synthesis process. Those functions are discussed in relation to FIGS. 2A-5B, which independently illustrate the various stages separate from the remainder of the device 10. FIGS. 2A and 2B illustrate the first stage 12. In some embodiments, the first stage 12 extends from a raw material receiving end 21 to a bottom end 23 opposite the raw material receiving end 21. The first stage 12 may be formed from a base 20 and a body 22 that enclose the hollow interior space of the first stage 12, where the body 22 extends upwardly from the base 20. The base 20 and the body 22 may have any geometry, but in the illustrated embodiment of FIG. 2A-2B, the base 20 is composed of a frustoconical wall and the body 22 is composed of a cylindrical wall that extends upwardly therefrom.

In some embodiments, a divider plate 25 extends along an inner surface (e.g., inner diameter) of the first stage 12. As illustrated in FIGS. 2A-2B, the divider plate 25 may be positioned at the raw material receiving end 21 or in proximity to the raw material receiving end 21. The divider plate 25 includes at least one opening 24 that is configured to receive raw materials that can be used to synthesize the product. Such raw materials can take a variety of forms, such as powders, particles, cells, microorganisms, pellets, and liquids. In the illustrated example, there are four openings 24 but any number of desired openings 24 may be configured in the divider plate 25. As is apparent from the cross-sectional view of FIG. 2B, each opening 24 is associated with a holding chamber 26 that extends down into the first stage 12 in which the raw materials can be received. In some embodiments, the holding chamber 26 is composed a holding chamber wall 27 that downwardly extends from a respective opening 24 to a holding chamber base 29 positioned in the hollow interior space of the first stage 12. When it is desired to synthesize a product, the appropriate constituent raw materials can be provided in the holding chambers 26. The holding chamber base 29 includes an exit port 31 that allows the raw materials to leave the holding chambers 26. Although not shown in FIG. 2B, the exit port 31 may include a valve that can be manually or automatically opened to allow the passage of raw materials to travel to the second stage 14. In some embodiments, the transition from the holding chambers 26 to the second stage 14 is achieved with the assistance of a vacuum that is applied to the holding chambers 26, which pulls raw materials through the exit port 31 to the second stage 14.

In some embodiments, raw materials can be directly provided within one or more of the holding chambers 26. For example, a raw material can be dropped or poured into a holding chamber 26, the top end of which can be sealed with an appropriate sealing element (e.g., cap). In other embodiments, each holding chamber 26 can alternatively or additionally be configured to receive a small container in which one or more raw materials are provided. For example, such a container can take the form of a sealed pod that is specifically configured to fit within a holding chamber 26. As another example, the container can take the form of a syringe that is likewise specifically configured to fit within one of the holding chambers 26. In addition to the one or more opening 24, there may be a supplemental opening 28 in the divider plate 25 that can be used to add solid or liquid raw materials or used as a suction port to remove material and/or gasses from the first stage 12. A sealing element (e.g., cap) may be utilized to seal the supplemental opening 28 when not in use.

In cases in which the raw materials are provided within containers that are inserted into the holding chambers 26, the containers can be simultaneously or sequentially actuated to release their raw materials. For example, if the raw materials are provided within sealed pods, the seals of the pods can be broken and the raw material can be drawn into the second stage 14. If the raw materials are provided with syringes, plungers of the syringes can be depressed to eject the raw materials into the second stage 14.

It is noted that the above-described opening of the holding chambers 26 as well as the actuation of the containers can either be achieved automatically or manually. As an example of automated operation, one or more motors can be used to act upon the holding chambers 26 and/or containers. As an example of manual operation, the mixing element 18 can be used to achieve the same purpose. As a further example of manual operation, a user can manually press the individual plungers of syringes received within the holding chambers 26.

Figure 3A:
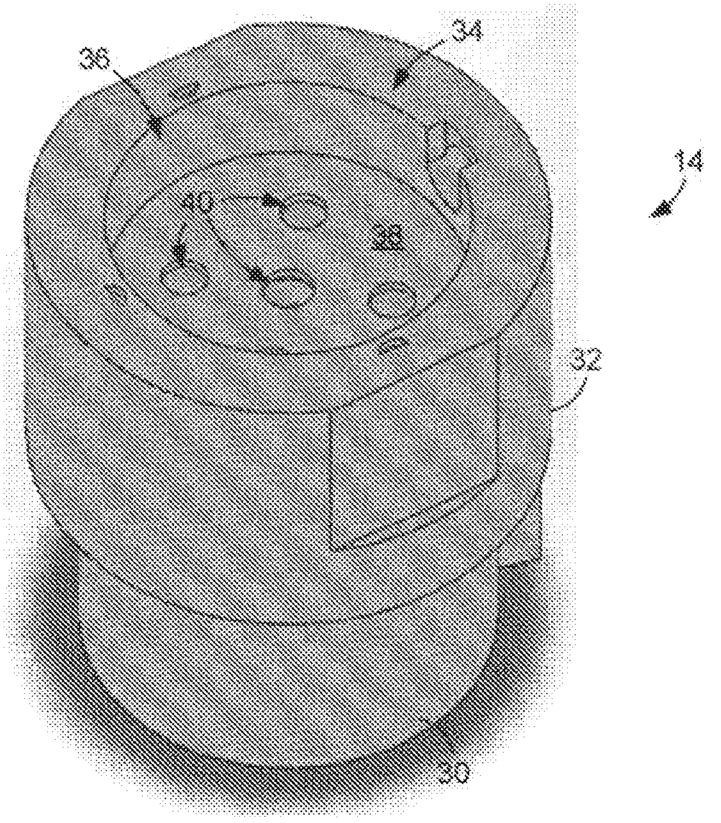
FIG. 3A is a perspective view of a second stage of a device according to some embodiments of the present disclosure.
Figure 3B:
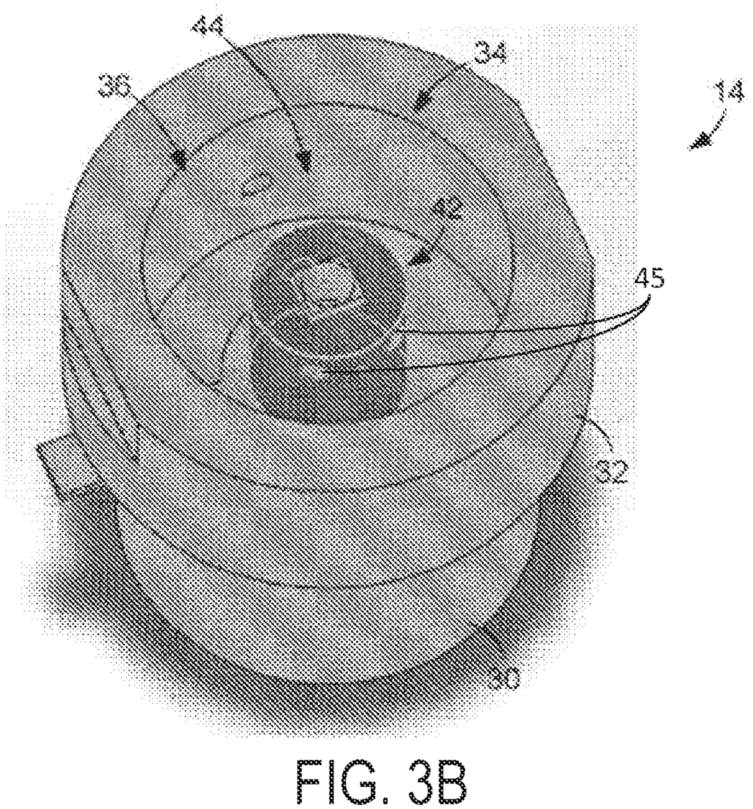
FIG. 3B is a perspective view of the second stage of FIG. 3A with a divider plate removed to illustrate the mixing chamber according to some embodiments of the present disclosure.

Referring next to FIGS. 3A and 3B, illustrated is the second stage 14. In some embodiments, the second stage 14 includes a mixing chamber 42 formed from a base 30 and a body 32. The base 30 and the body 32 may have any geometry, but in the illustrated example, the body 32 is composed of a cylindrical wall that extends upwardly from a cylindrical base 30. In some embodiments, the body 32 has a greater diameter than the base 30.

As shown in FIG. 3A, a top end of the body 32 includes an opening 34 that provides access to a hollow interior space 36 defined by the base 30 and the body 32 of the second stage 14. Provided within the hollow interior space 36 is a divider plate 38 that includes at least one opening 40. In some embodiments, the divider plate 38 includes one opening 40 for each holding chamber 26 and the supplemental opening 28. FIG. 3B shows the second stage 14 with the divider plate 38 removed. As is apparent from that figure, provided within the hollow interior space 36 below the plate 38 is the mixing chamber 42 into which the various raw materials can be delivered from the first stage 12. As shown in FIG. 3B, the presence of the mixing chamber 42 within the hollow interior space 36 creates an annular space 44 that can be utilized to house a variety of components, such as one or more of a heat transfer device configured to heat the mixing chamber 24, a cooling device configured to cool the mixing chamber, and one or more mixing device configured to grind and/or mix the raw materials. In some embodiments, the heat transfer device or cooling device are located external to the second stage 14, e.g., as heating or cooling jackets. Additionally or alternatively, radiant heating devices may be used to provide heat to the mixing chamber 24.

Once the raw materials are delivered to the mixing chamber 42, they can be mixed together under desired conditions (e.g., heating and/or cooling) to synthesize the product. Such mixing can be automated or manually controlled using the one or more mixing device. For example, the mixing device may include one or more motors or actuators that rotate or otherwise displace the mixing chamber 14 and/or actuate the mixing element 18 (e.g., impeller)

provided within the mixing chamber 14. In some embodiments, the mixing element 18 extends from outside of the device 10 through the supplemental opening 28 in the first stage 12 and an opening 40 in the second stage 14 to the mixing chamber 24. Although not shown in FIG. 4, the mixing element 18 may include one or more agitator blades that are sized to promote mixing and/or grinding of the raw materials in the mixing chamber 42.

Additionally or alternatively, the mixing element 18 can be manually manipulated by a user to grind and mix the raw materials together. For example, the mixing element 18 can be linearly displaced and/or rotated via an actuator or motor relative to the remainder of the device 10 to crush and/or mix the materials (see, e.g., FIG. 4, which shows an embodiment of the mixing element 18 that is provided within the mixing chamber 42).

In some embodiments, a vacuum line 52 can be connected to the second stage 14 (see, e.g., FIG. 3D below) to remove gasses and/or particulate matter that are a byproduct of the synthesis process. The vacuum line can be connected to a filtration device, such as an electrostatic filtration device that incorporates a high-efficiency particulate air (HEPA) filter that prevents particulate matter from escaping and entering the ambient environment. In addition, an activated carbon filter can be used to neutralize fumes created during the synthesis process. In some embodiments, such a filter can be located downstream of the HEPA filter. An exhaust blower can be used to return clean air to the space in which the device is used.

Figure 3C:
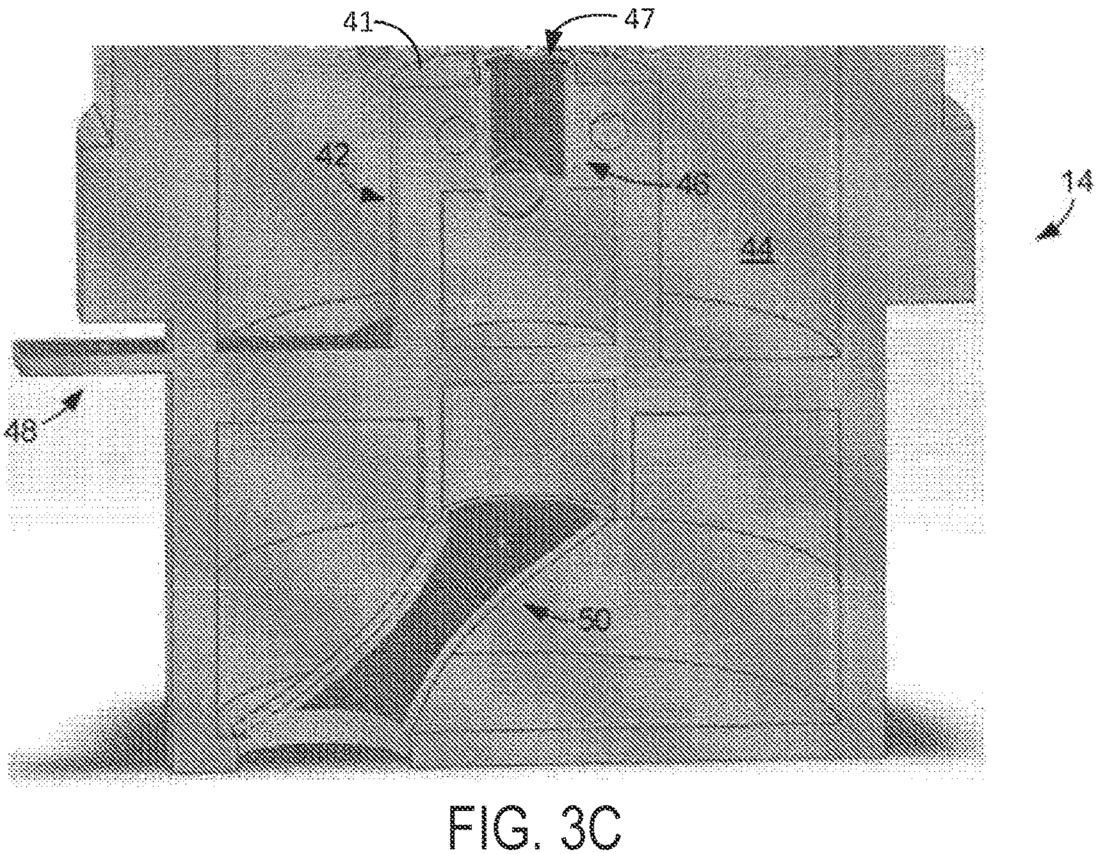
FIG. 3C is a cross-sectional view of potential second and third stages of a device according to some embodiments of the present disclosure.
Figure 3D:
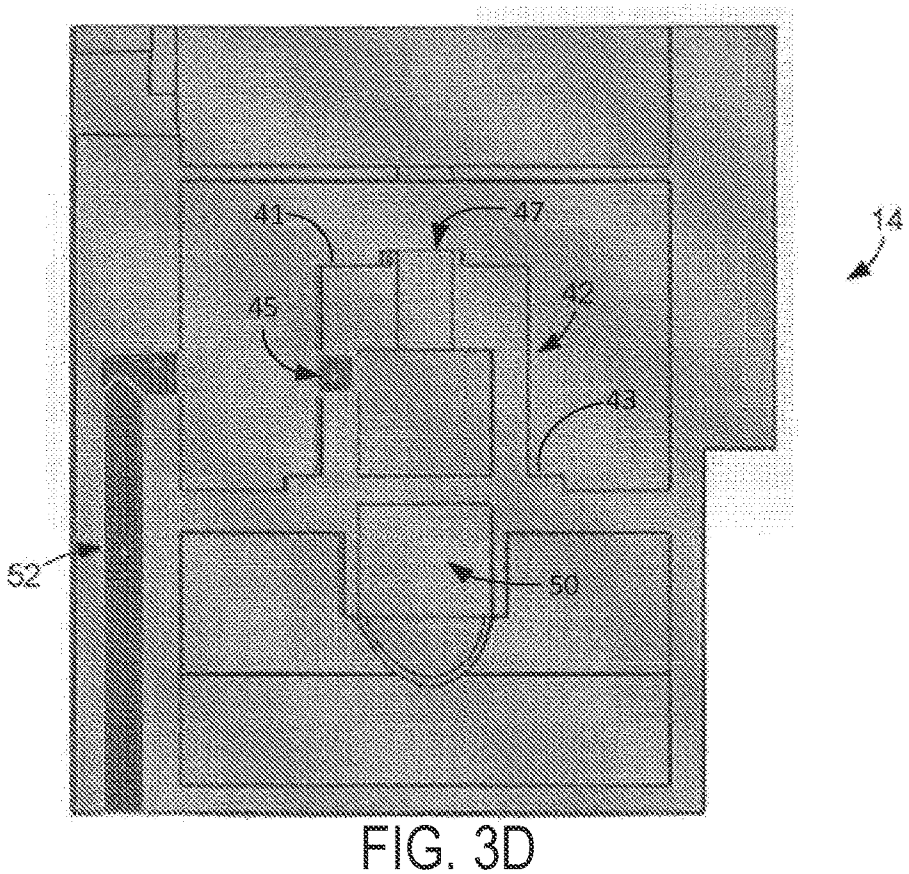
FIG. 3D is a cross-sectional view of second and third stages of a device illustrating a vacuum line connected to the second stage according to some embodiments of the present disclosure.
Figure 4:
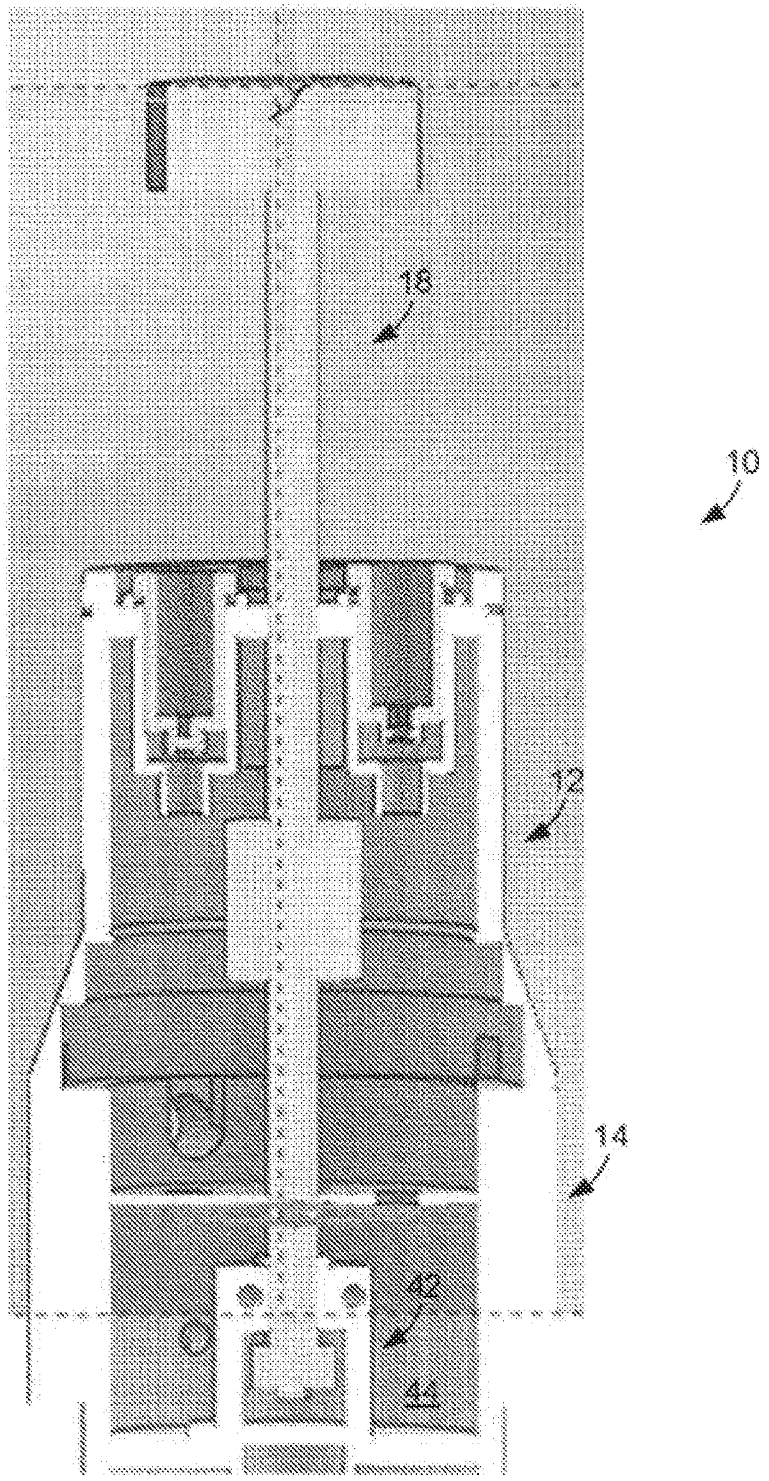
FIG. 4 is an assembled, cross-sectional view of first and second stages of a device according to some embodiments of the present disclosure.

FIGS. 3C and 3D are cross-sectional views that illustrate further internal aspects of the second stage 14. Shown in FIG. 3C, a second mixing chamber 46 is positioned at the bottom of the second stage 14. The second mixing chamber 46 extends between a mixing element receiving end 41 and a base engagement end 43 opposite the mixing element receiving end 41. The second mixing chamber 46 defines a hollow internal section that extends between an opening 47 in the mixing element receiving end 41 to an exit port 50 positioned in the base 30 of the second stage 14. The hollow internal section is sized to receive at least a portion of a distal end of the mixing element 18. The second mixing chamber 46 further includes at least one opening 45 that allows the passage of raw material from the mixing chamber 42 into the hollow internal section of the second mixing chamber 46.

Also shown in FIG. 3C is a valve 48 that regulates the passage of raw materials and synthesized product between the hollow internal section of the second mixing chamber 46 and the exit port 50 of the second stage 14. The valve 48 is movable between an open position that allows raw materials and synthesized products to exit the second mixing chamber through the exit port and a closed position that prevents raw materials and synthesized products from exiting the second mixing chamber 46.

In some embodiments, the valve 48 is a lever 48 that can be used to open the bottom of the mixing chamber 42 and scrape off its contents once the desired compound has been synthesized. By way of example, the lever 48 can be automatically and/or manually displaced (e.g., by a motor or actuator) in a radial direction to align an opening in the lever with the hollow section of the second mixing chamber 46. Once the lever 48 has been actuated, the opening in the lever allows the passage of raw material and the synthesized product from the second mixing chamber 46 to an outlet 50. In some embodiments, the device 10 includes a vacuum pump configured to apply suction to the exit port 50. The synthesized product can be drawn out from the second mixing chamber 46 under a vacuum so that it will travel through the outlet 50 and exit the second stage 14.

FIG. 3D shows a further cross-section of the second stage 14 that reveals a vacuum line 52 that is in fluid communication with the mixing chamber 42 through which gases and particulate matter can be removed from the mixing chamber 42, as described above. The vacuum line 52 extends down to the bottom end of the second stage 14 and, therefore, extends into the third stage 16.

Figure 5A:
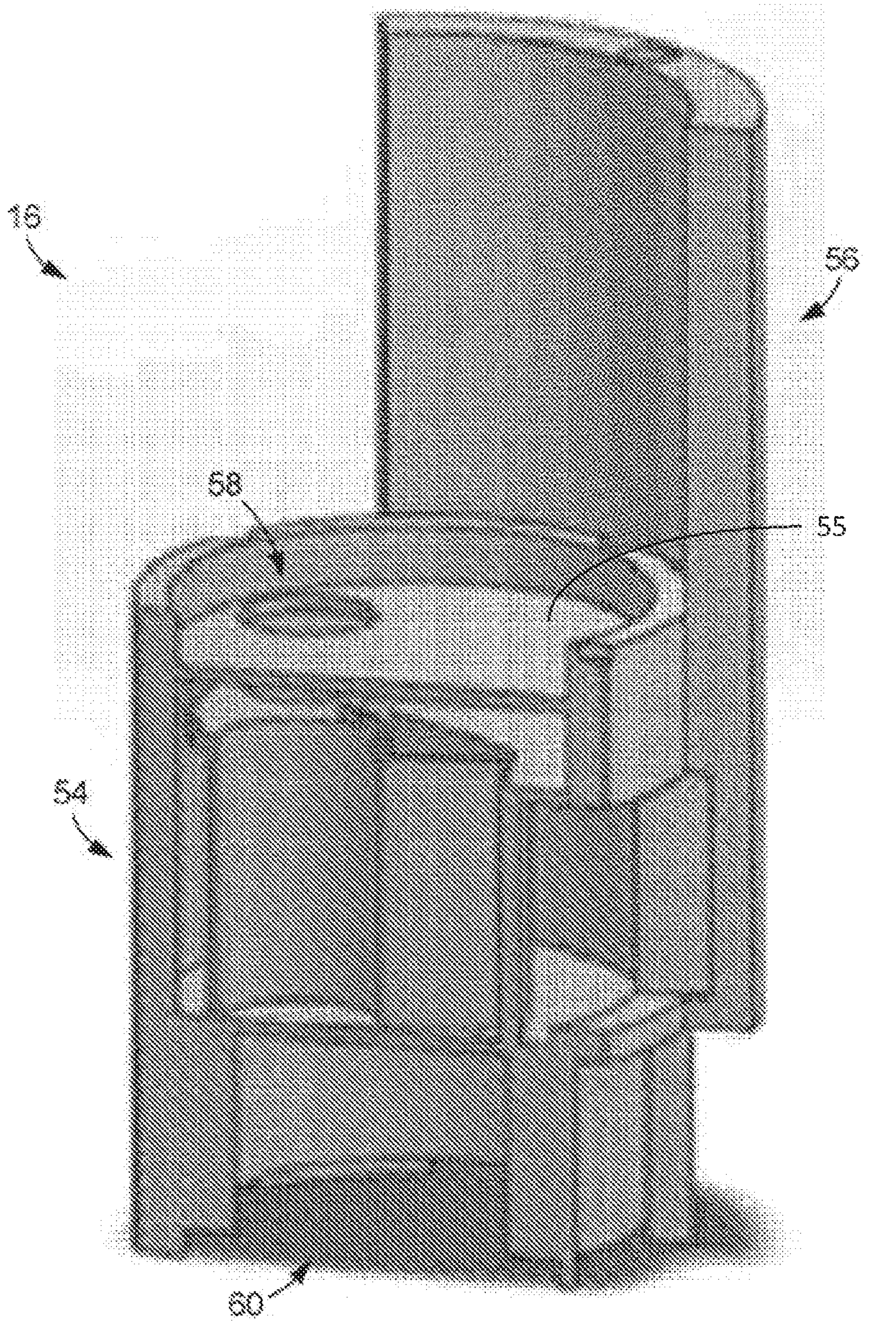
FIG. 5A is a cross-sectional view of a third stage of a device according to some embodiments of the present disclosure.

FIG. 5A illustrates the third stage 16 in cross-section. In some embodiments, the third stage 16 includes a body 54 having a hollow interior space and a flange 56 which upwardly extends from the body 54. The body 54 may have any geometry, but in the illustrated embodiment of FIG. 5A, the body 54 is composed of a cylindrical wall and the flange 54 forms an arcuate wall that extends upwardly therefrom. Provided at a top end of the body 54 is a divider plate 55 that extends along an inner surface (e.g., inner diameter) of the body 54. The divider plate 55 includes at least one opening 58 through which the synthesized product can be received from the second stage 14. Within the third stage 16, moisture can be extracted from the synthesized product in a dryer, and the product can be stored in or output from the device 10. Any dryer may be used in the third stage 16. For example, suitable dryers include, but are not limited to, a flash dryer, spray dryer, fluid bed dryer, cabinet dryer, tunnel dryer, rotary dryer, spouted bed dryer, drum dryer, agitated pan dryer, rotary dryer, tray dryer, infrared dryer, microwave dryer, freeze drying, osmotic dehydration, or combinations thereof.

In some embodiments, the compound can first be purified within the third stage 16 by using a recrystallization device that is configured to crystalize the product. Also shown in FIG. 5A is a cavity 60 at the bottom of the third stage 16 in which one or more motors or actuator can be provided that are configured to operate a sweeper, which is described below.

Figure 5B:
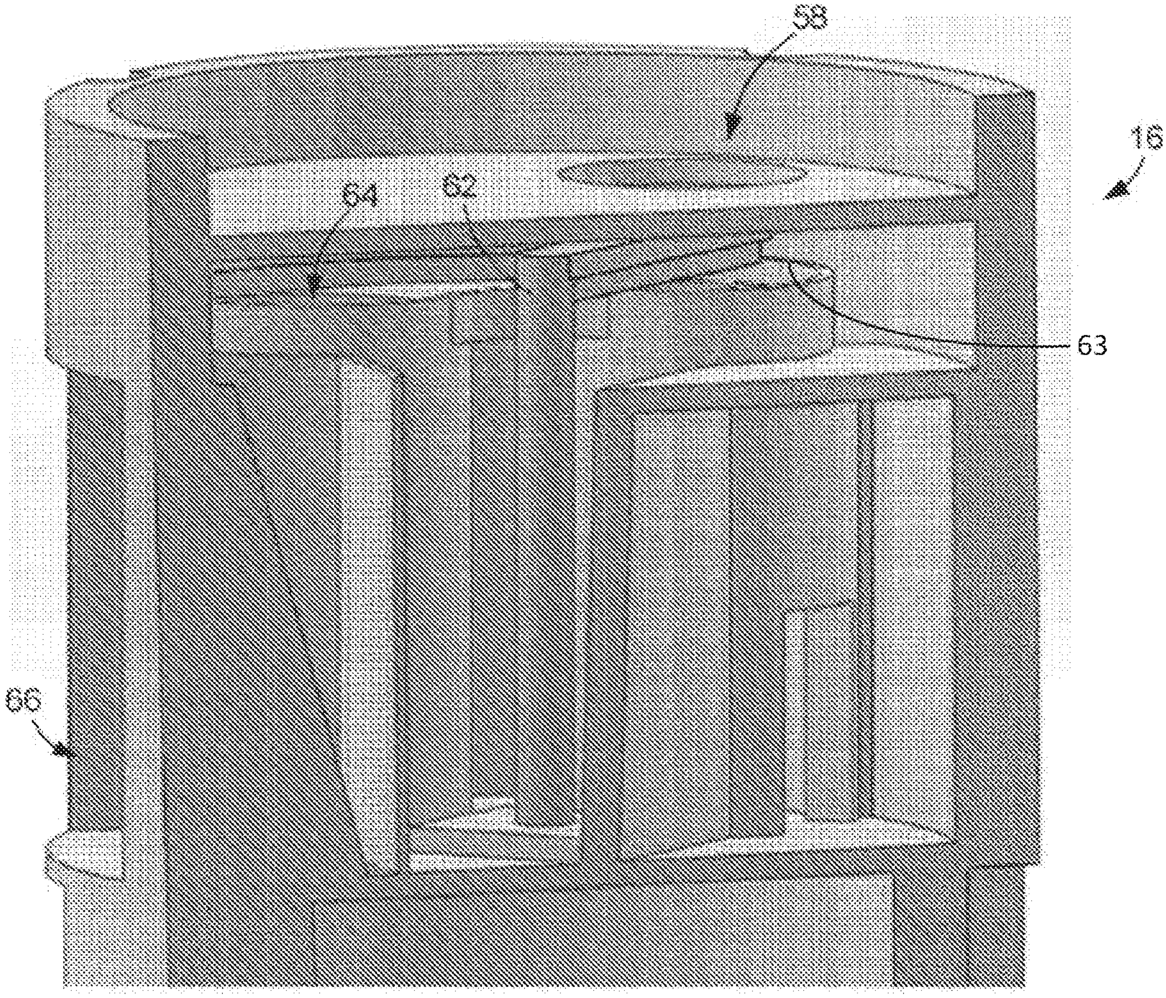
FIG. 5B is a cross-sectional view of a third stage of a device illustrating a sweeper and platform according to some embodiments of the present disclosure.

FIG. 5B illustrates internal components of the third stage 14. As shown in this figure, positioned below the opening 58 is a sweeper 62 that can be automatically or manually rotated to sweep the synthesized product along a platform 63 that receives the synthesized product form the second stage 14 or upstream process unit (e.g., dryer or recrystallization device). The sweeper 62 may be configured to sweep the synthesized product along the platform 63 to a further opening 64 configured in the platform 63. The further opening 64 is connected to an exit port 66 from which the product can be removed from the device 10. By way of example, the compound can be in the form of a powder, pellet, pill, or other form that be ingested or topically applied to the skin.

As described above, device 10 can include one or more mechanisms that automate the synthesis process. One or more of those mechanisms may require power to operate, which can, for example, be provided using a suitable power source that can be separate from or incorporated into the device 10. Such a power source can, for example, comprise one or more batteries or an outlet. In cases in which one or more mechanisms are computer controlled, the device 10 can either include or be connected to a suitable computing device that comprises some form of controller, such as a processor or a microcontroller. The computing device, whether integrated into the device 10 or separate therefrom, can further include appropriate software and/or firmware configured to control operation of the mechanisms and the device 10 as a whole. In addition, in cases in which the device 10 incorporates some form of computing power, the device can further include one or more communication devices, such as wireless communication devices, to transmit and/or receive information, such as commands and data, in relation to another computing device.

It is noted that various other features can be added to the disclosed compound synthesis device. For example, the device can include one or more user interfaces to control operation of the device, such as activation of one or more of the powered mechanisms. In addition, the device can include one or more sensors that monitor functioning of the device, conditions within the device (e.g., radiation levels), and/or the condition of the compounds that have been synthesized within the device.

It is also noted that one or more additional inlets and/or outlets can be added to the compound synthesis device to enable the input and/or output of substances and compounds.

It is further noted that, while the compound synthesis device has been described in the context of pharmaceutical compound synthesis in low-gravity environments, the device or one similar to it can be used for other purposes in other environments. For example, the device can be used to synthesize compounds, such as medicine or foods, in remote locations on earth in which such compounds are not readily available, such as remote and/or austere locations. The device can further be used for wilderness and urban mitigation, and for preparedness, response, and recovery for emergency management services. The device additionally can be used to produce small quantities of pharmaceuticals on demand for medical personnel and emergency care, for maintaining and continuing essential services in the event of power outages, for administration of necessary medication that may no longer be available due to civil disruption, technology, or natural disasters, and provides a needed back-up during long term power outages and delays in delivery due to manufacturing and/or shipment delays.

As discussed above, there is interest in synthesizing products in a microgravity environment, as the weightlessness can impart unique characteristics to the product that are not observed when synthesized normal gravity on earth. Further, certain products may be synthesized in microgravity, but not under normal earth gravity. The device 10 provides a practical medium for synthesizing products in a microgravity environment. The device 10 can be designed to be small and light making it practical to deliver to microgravity environments, such as an orbiting space station.

In some embodiments, the present disclosure provides a method of synthesizing a product using the device 10. The method includes feeding raw materials to the at least one holding chamber 26. The raw materials may be fed to the holding chamber 26 as a liquid, powder, particle, cell, microorganism, pellet, or a combination thereof. Additionally or alternatively, the raw material may be provided to the holding chamber 26 in a container, such as a sealed pod or syringe. The method further includes transporting the raw material from the holding chamber 26 to the second stage 14. In some embodiments, transporting the raw material to the second stage 14 includes sealing the holding chamber 26 and applying a vacuum to pull the raw materials into the second stage 14. In some embodiments, transporting the raw material may include depressing a plunger of a syringe to eject the raw materials into the second stage 14. The method may also include breaking the sealed pod and drawing the raw materials to the second stage 14, e.g., via vacuum.

The method further includes mixing the raw materials in the mixing chamber 42 or the second mixing chamber 46 with the mixing element 18. In some embodiments, the method includes transporting the raw materials to the hollow internal section of the second mixing chamber 46 through the at least one opening 45. In some embodiments, the method includes grinding and/or mixing the raw materials using the mixing element 18, and reacting the raw materials in the mixing chamber 42 or the second mixing chamber 46 to produce the synthesized product. The heat transfer device and the cooling device may be used to adjust the temperature to a desired range for the desired product. In some embodiments, the method includes removing byproduct gases or particulate matter from the mixing chamber 42 using the vacuum line 52. The method further includes passing the byproduct gases or particulate matter through a filter (e.g., HEPA filter or activated carbon filter) to prevent particulate matter from escaping and entering the ambient environment.

Additionally or alternatively, the method may include withdrawing a product or byproduct from the mixing chamber 42 via access through the first stage 12 or the second stage 14. In some embodiments, the product or byproduct is removed through the at least one opening 24 in the divider plate 25 of first stage 12, or through the supplemental opening 28. In some embodiments, the method includes performing testing on the removed product or byproduct, or collecting the product or byproduct as an alternative end-product derivative. In some embodiments, the method includes using the removed product or byproduct in multiomic platforms for data analysis (e.g., epigenomics, genomics, proteomics, metabolomics, transcriptomics, translatomics, methylomics, and pharmaco-genetics. Exemplary synthesized products or byproducts that may be removed from the mixing chamber 42 include, but are not limited to, liquid media, solutes, supernatants, pharmaceutical or therapeutic compounds (i.e., drugs), ceramics, catalysts, biological polymers (i.e., proteins, enzymes), cells, tissues, or combinations thereof.

Once the reaction is completed, the method further includes transporting the synthesized product to the third stage 16. In some embodiments, transporting the synthesized product to the third stage 16 includes opening valve 48 and applying a vacuum to draw the synthesized product through exit port 50 to the third stage 16. Once in the third stage 16, the method may include separating the synthesized product from the raw materials (e.g., via the recrystallization device), and drying the synthesized product using the dryer. The method further includes dispensing the synthesized product from the device 10 by transporting the synthesized product to platform 63 and actuating the sweeper 62 to sweep the synthesized product across the platform 63 to a further opening 64 configured in the platform 63. The product is then removed from the device 10 through an exit port 66 that is connected to the further opening 64.

It should be appreciated that various other modifications and variations to the preferred embodiments can be made within the spirit and scope of the invention. Therefore, the invention should not be limited to the described embodiments. To ascertain the full scope of the invention, the following claims should be referenced.

The invention claimed is:

1. A device comprising:

a housing comprising at least a first stage and a second stage, wherein a top end of the second stage is connected to a bottom end of the first stage, and wherein the first stage includes a divider plate that extends between opposing interior surfaces of the first stage, the divider plate having at least one opening, a holding chamber configured to receive raw materials to be used to synthesize a product, the holding chamber including a holding chamber wall that extends from the at least one opening to a holding chamber base wall in a hollow interior space, the holding chamber having an exit port that allows passage of the raw material from the first stage to the second stage, and wherein the second stage includes a mixing chamber in which the raw materials can be received from the holding chamber and mixed together to synthesize the product; and a mixing element that extends through a supplemental opening in the divider plate in the first stage to the mixing chamber, wherein the mixing element is configured to mix or grind raw materials and the synthesized product in the mixing chamber; and wherein the second stage comprises a second mixing chamber positioned on the bottom of the second stage, the second mixing chamber extending from a mixing element receiving end to a base engagement end that is connected to a base of the second stage, the second mixing chamber defining a hollow internal section that extends from an opening in the mixing element receiving end to an exit port positioned in the base of the second stage, the hollow internal section sized to receive a distal end of the mixing element, and wherein the second mixing chamber includes at least one opening that allows the passage of raw material from the mixing chamber into the hollow internal section of the second mixing chamber.

2. The device of claim 1 further comprises at least one of an actuator or a motor, to linearly displace or rotate the mixing element.

3. The device of claim 1, wherein the holding chamber is configured to receive a container in which the raw materials are provided.

4. The device of claim 3, wherein the container comprises at least one sealed pod.

5. The device of claim 3, wherein the container comprises a syringe.

6. The device of claim 1, wherein the second stage includes a valve that regulates the passage of raw material and synthesized product between the hollow internal section of the second mixing chamber and the exit port of the second stage, wherein the valve is movable between an open position and a closed position, wherein the open position allows raw materials and synthesized products to exit the second mixing chamber through the exit port and the closed position prevents raw materials and synthesized products from exiting the second mixing chamber.

7. The device of claim 6, wherein the valve is a lever that is displaceable to align an opening in the lever with the hollow section of the second mixing chamber and the exit port.

8. The device of claim 1, further comprising a vacuum line in fluid communication with the mixing chamber that is configured to remove byproduct gases and particulate matter.

9. The device of claim 8, wherein the vacuum line is connected to a filter.

10. The device of claim 9, wherein the filter is a high-efficiency particular air (HEPA) filter.

11. The device of claim 1, further comprising a third stage connected to the bottom end of the second stage.

12. The device of claim 11, wherein the third stage comprises a platform that receives the synthesized product from the second stage and a sweeper, wherein the sweeper is configured to rotate and sweep the synthesized product along the platform to a further opening in the platform.

13. The device of claim 12, wherein the further opening is connected to an exit port from which the synthesized product exits the device.

14. A method of using the device of claim 1, the method comprising the steps of:

feeding the raw materials to the at least one holding chamber;

transporting the raw materials to the mixing chamber of the second stage;

mixing the raw materials in the mixing chamber using the mixing element to produce the synthesized product.

15. The method of claim 14, wherein the device is in a microgravity environment when producing the synthesized product.

16. The method of claim 14, wherein the step of transporting the raw materials to the mixing chamber of the second stage includes sealing the at least one holding chamber and applying a vacuum to pull the raw materials into the mixing chamber of the second stage, or wherein the step of transporting the raw materials to the mixing chamber of the second stage includes depressing a plunger of a syringe to eject the raw materials into the mixing chamber of the second stage.

* * * * *